United States Patent
Connelly et al.

(10) Patent No.: US 8,911,832 B2
(45) Date of Patent: Dec. 16, 2014

(54) METHOD OF MITIGATING ICE BUILD-UP ON A SUBSTRATE

(71) Applicant: PPG Industries Ohio, Inc., Cleveland, OH (US)

(72) Inventors: Bruce A Connelly, Gibsonia, PA (US); Edward Francis Rakiewicz, Gibsonia, PA (US); Davina J Schwartzmiller, Allison Park, PA (US); Michael Zalich, Pittsburgh, PA (US); Scott Joseph Moravek, Cranberry Township, PA (US); Jane N. Valenta, Pittsburgh, PA (US); Steven R Zawacky, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 16 days.

(21) Appl. No.: 13/688,622

(22) Filed: Nov. 29, 2012

(65) Prior Publication Data

US 2013/0142957 A1  Jun. 6, 2013

Related U.S. Application Data

(60) Provisional application No. 61/566,077, filed on Dec. 2, 2011.

(51) Int. Cl.
| | | |
|---|---|---|
| *C09D 5/00* | (2006.01) | |
| *B05D 5/00* | (2006.01) | |
| *C09D 175/04* | (2006.01) | |
| *C09D 183/04* | (2006.01) | |

(52) U.S. Cl.
CPC .............. *C09D 5/00* (2013.01); *C09D 175/04* (2013.01); *C09D 183/04* (2013.01)
USPC .................... 427/407.1; 427/407.3; 427/409; 427/387; 427/412.1

(58) Field of Classification Search
USPC ....................................................... 427/407.1
See application file for complete search history.

(56) References Cited

U.S. PATENT DOCUMENTS

| | | | | |
|---|---|---|---|---|
| 2,470,772 | A | * | 5/1949 | Haas .............................. 428/447 |
| 5,045,599 | A | * | 9/1991 | Murase ......................... 525/102 |
| 5,275,645 | A | | 1/1994 | Ternoir et al. |
| 5,618,860 | A | | 4/1997 | Mowrer et al. |
| 6,702,953 | B2 | * | 3/2004 | Simendinger et al. .......... 252/70 |
| 6,797,795 | B2 | | 9/2004 | Byrd |
| 6,809,169 | B2 | | 10/2004 | Byrd et al. |
| 7,799,434 | B2 | | 9/2010 | Webster et al. |
| 7,820,770 | B2 | | 10/2010 | Schoeley et al. |
| 7,910,683 | B2 | | 3/2011 | Byrd et al. |
| 8,202,620 | B2 | * | 6/2012 | Simon et al. .................. 428/442 |
| 2003/0232941 | A1 | | 12/2003 | Byrd |
| 2003/0235696 | A1 | | 12/2003 | Byrd |
| 2008/0199723 | A1 | | 8/2008 | Cho et al. |
| 2008/0213599 | A1 | | 9/2008 | Webster et al. |
| 2008/0286473 | A1 | | 11/2008 | Smith et al. |
| 2010/0280148 | A1 | | 11/2010 | Webster et al. |
| 2010/0323190 | A9 | | 12/2010 | Webster et al. |
| 2011/0082254 | A1 | | 4/2011 | Sepeur et al. |

FOREIGN PATENT DOCUMENTS

| | | |
|---|---|---|
| EP | 1849843 A1 | 10/2007 |
| WO | 2006006402 A1 | 1/2006 |
| WO | 2012065828 A1 | 5/2012 |

OTHER PUBLICATIONS

A. Dotan, et al., The Relationship between Water Wetting and Ice Adhesion, Journal of Adhesion Science and Technology 23 (2009) pp. 1907-1915.
Fraunhofer IFAM, Dr. Volkmar Stenzel, Anti - icing: Surfaces, Technical Approaches and Status, ECC "Smart Coatings" 2010, Berlin, Nov. 10, 2010, pp. 1-24.
NuSil Silicone Technology, Burkitt et al., Silicone Coatings for Aircraft, Sep. 25, 2007, pp. 1-16.

* cited by examiner

*Primary Examiner* — William Phillip Fletcher, III
(74) *Attorney, Agent, or Firm* — Krisanne Shideler

(57) ABSTRACT

The present invention is directed to a method of mitigating ice build-up on a substrate, comprising applying to the substrate combinations of curable film-forming compositions. The curable film-forming compositions may comprise functional film-forming polymers and curing agents or any of various polysiloxanes and optionally silanes with reactive groups. The film-forming compositions can be applied directly to the surface of the substrate or to a primer coat on the substrate.

22 Claims, No Drawings

US 8,911,832 B2

1

METHOD OF MITIGATING ICE BUILD-UP ON A SUBSTRATE

CROSS-REFERENCE TO RELATED APPLICATIONS

This application claims the benefit of U.S. Provisional Application Ser. No. 61/566,077, filed Dec. 2, 2011.

FIELD OF THE INVENTION

The present invention relates to methods of mitigating ice build-up on substrates, particularly suitable for use on wind or turbine blades and aircraft parts such as wings and propeller blades.

BACKGROUND OF THE INVENTION

Wind power is the conversion of wind energy into a useful form, such as electricity, using wind turbines. At the end of 2007, worldwide capacity of wind-powered generators was 94.1 gigawatts. Although wind currently produces just over 1% of world-wide electricity use, it accounts for approximately 19% of electricity production in Denmark, 9% in Spain and Portugal, and 6% in Germany and the Republic of Ireland (2007 data). Globally, wind power generation increased more than fivefold between 2000 and 2007.

Wind power is produced in large scale wind farms connected to electrical grids, as well as in individual turbines for providing electricity to isolated locations. Wind turbines typically have 2 to 4 large blades and are designed to last around 20 to 25 years. The optimum number of blades for a wind turbine depends on the job the turbine will do. Turbines for generating electricity need to operate at high speeds, but do not need much torque or turning force. These machines generally have two or three blades. Wind pumps, in contrast, operate with more torque but not much speed and therefore have many blades.

Wind turbine blades are constantly exposed to the elements and must be designed to endure temperature extremes, wind shears, precipitation, and other environmental hazards without failure. Build-up of ice on the blade substrate leads to lower efficiencies as the blades become heavier and harder to turn.

It would be desirable to provide a method of mitigating ice build-up to protect wind and turbine blades and maximize the efficiency of the blades in extreme weather. Ideally, coating compositions could be applied to blade substrates.

SUMMARY OF THE INVENTION

The present invention is directed to a method of mitigating ice build-up on a substrate, comprising applying to the substrate a first curable film-forming composition, wherein the first curable film-forming composition comprises:

(a) a polymeric polyol and a polyisocyanate curing agent; or (b) a polysiloxane polymer and a silane curing agent comprising at least two alkoxy and/or acyloxy functional groups; and applying to the first curable film-forming composition a second curable film-forming composition, wherein the second curable film-forming composition comprises:

(i) (a) a curing agent comprising isocyanate functional groups;

2

(b) at least one film-forming polymer comprising functional groups reactive with the isocyanate groups in (a); and optionally (c) a polysiloxane present in the second curable film-forming composition in an amount sufficient to mitigate Ice build-up on the substrate when subjected to conditions conducive to ice formation; or (ii) a polysiloxane polymer and a silane curing agent comprising at least two alkoxy and/or acyloxy functional groups; wherein upon application of the curable film-forming compositions to the substrate and upon curing, the first curable film-forming composition demonstrates a lower Young's modulus than the second curable film-forming composition, and the coated substrate demonstrates a maximum average load force of 400 N when subjected to ICE ADHESION TEST.

In a separate embodiment of the present invention, the first curable film-forming composition comprises a polysiloxane polymer and a slime curing agent comprising at least two alkoxy and/or acyloxy functional groups as above, and application of a second curable film-forming composition is optional.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques, Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an" and the include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

In the method of the present invention, ice build-up on a substrate is mitigated by applying to the surface of the substrate a curable film-forming composition. Suitable substrates in the method of the present invention include plastic, rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain embodiments of the present invention, the substrate comprises a composite material such as a fiberglass and/or carbon fiber composite. In a particular embodiment, the substrate is a fiberglass composite in the form of a wind blade. The method is also suitable for mitigating ice build-up on substrates used in turbines and aircraft parts such as propeller blades and wings.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

In the method of the present invention, curable film-forming compositions are applied to at least one surface of the substrate. A substrate may have one continuous surface, or two or more surfaces such as two opposing surfaces. Typically the surface that is coated is any that is expected to be exposed to conditions conducive to ice build-up.

The first curable film-forming composition applied to the substrate in the method of the present invention may comprise (a) a polymeric polyol and a polyisocyanate curing agent.

The curing agent used in the first curable film-forming composition (a) may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4'-tetramethylene diisocyanate and 1,6'-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and $\alpha,\alpha,\alpha',\alpha'$-tetramethylmeta-xylylene diisocyanate.

Trifunctional isocyanates may also be used as the curing agent, for example, timers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3300, which is the isocyanurate of hexamethylene diisocyanate, available from Bayer Corporation. Specifically used polyisocyanates are trimers of diisocyanates such as hexamethylene diisocyanate and isophorone diisocyanate.

The polyisocyanate may also be one of those disclosed above, chain extended with one or more polyamines and/or polyols using suitable materials and techniques known to those skilled in the art.

The polyisocyanate curing agent is present in the first film-forming composition (a) in an amount ranging from 10 to 90 percent by weight, such as 40 to 65 percent by weight, often 50 to 60 percent by weight, based on the total weight of resin solids in the composition.

The first curable film-forming composition used in the method of the present invention further comprises at least one polymeric polyol. The polymeric polyol may comprise a hydroxyl functional acrylic polymer, polyester polymer, polyurethane polymer, and/or polyether polymer. Often an acrylic polymer and/or polyester polymer having multiple hydroxyl functional groups is used.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer includes hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl)phenyl glycidyl ether. Preferred glycidyl esters include those of the structure:

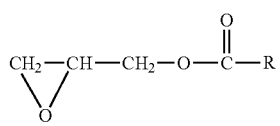

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

In certain embodiments of the present invention, the polymer used in the first curable film-forming composition comprises a fluorinated acrylic polymer. Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth)acrylate resins.

A polyester polymer may be used as the polymeric polyol in the first curable film-forming composition (a). Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Polyurethanes can also be used in the first curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Examples of polyether polyols are polyalkylene ether polyols which include those having the following structural formula:

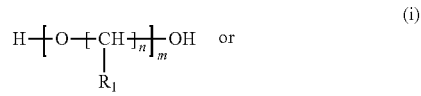

(i)

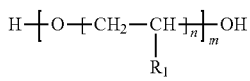

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene)glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp. Polytetrahydrofuran is also suitable.

The polymeric polyol is present in the first film-forming composition in an amount ranging from 10 to 90 percent by weight, such as 35 to 60 percent by weight, often 40 to 50 percent by weight, based on the total weight of resin solids in the composition.

In certain embodiments of the present invention, the polyisocyanate curing agent is used in relative excess to the polymeric polyol in the first curable film-forming composition. For example, the equivalent ratio of isocyanate groups in the curing agent to functional groups in the film-forming polymer may be 1.1 to 2.0:1, often 1.1 to 1.7:1, or 1.5 to 1.7:1.

In other embodiments of the invention, the first curable film-forming composition comprises (b) a polysiloxane polymer and a silane curing agent having at least two alkoxy and/or acyloxy functional groups, such as acetoxy functional groups. The polysiloxane polymer typically has active hydrogen groups such as hydroxyl groups. The silane curing agent can be generically represented as $(R_1)_x$—Si—$(O-R_2)_y$, where x+y=4 and y=2 to 4, and $R_1$ and $R_2$ groups may independently be alkyl, aryl, acyl, or cycloalkyl groups having 1 to 12 carbon atoms. Examples of silane curing agents having alkoxy functional groups include tetraethoxysilane, tetraisopropoxysilane, tetra-n-propoxysilane, methyltrimethoxysilane, methyltriethoxysilane, vinyltrimethoxysilane, and vinyltriethoxysilane, and also their partial hydrolysates. Examples of silane curing agents having acyloxy functional groups such as acetoxy functional groups include methyltriacetoxysilane, ethyltriacetoxysilane, propyltriacetoxysilane, vinyltriacetoxysilane, and also their partial hydrolysates. The partial hydrolysates here can be partial homohydrolysates, i.e. partial hydrolysates of one type of organosilicon compound, or else partial cohydrolysates, i.e. partial hydrolysates of at least two different types of organosilicon compounds.

The polysiloxanes generally have the formula: R"—O—[Si(R')$_2$—O—]$_n$—R" where each R' is selected from the group consisting of hydroxyl, alkyl, aryl and alkoxy groups having up to six carbon atoms. Each R" is selected from the group consisting of hydrogen and alkyl and aryl groups having up to six carbon atoms and wherein n is selected so that the molecular weight of the polysiloxanes may be in the range of from 200 to 14,000, such as 400 to 12000, or 900 to 2000.

After application of the first curable film-forming composition to the substrate, a second curable film-forming composition is applied to the first curable film-forming composition. In certain embodiments when the first curable film-forming composition comprises (b) above; i.e., a polysiloxane polymer and a silane curing agent having at least two alkoxy and/or acyloxy functional groups, the second curable film-forming composition is optional.

When used, the second curable film-forming composition comprises:
(i) (a) a curing agent comprising isocyanate functional groups;
(b) at least one film-forming polymer comprising functional groups reactive with the isocyanate groups in (a); and optionally
(c) a polysiloxane present in the second curable film-forming composition in an amount sufficient to mitigate ice build-up on the substrate when subjected to conditions conducive to ice formation.

The curing agent (i) (a) may be any of the polyisocyanate curing agents disclosed above that are used in the first curable film-forming composition.

The second curable film-forming composition used in the method of the present invention may further comprise at least one film-forming polymer (i) (b) having multiple functional groups reactive with the isocyanate groups in (i) (a). Such functional groups are typically hydroxyl and/or amine functional groups.

The film-forming polymer (b) may comprise a hydroxyl and/or amine functional acrylic polymer, polyester polymer, polyurethane polymer, and/or polyether polymer. Often an acrylic polymer and/or polyester polymer having multiple hydroxyl functional groups is used.

Any of the polymeric polyols disclosed above may be used in the second curable film-forming composition of the present invention. Also, useful amine functional film-forming polymers include polyoxypropylene amines commercially available under the trademark designation JEFFAMINE®; amine functional acrylic polymers and polyester polymers prepared as known in the art are also suitable. The film-forming polymers may be used in the amounts disclosed above for the polymeric polyols.

The second curable film-forming composition used in the method of the present invention may further comprise (c) a polysiloxane present in the curable film-forming composition in an amount sufficient to mitigate ice build-up on the substrate when subjected to conditions conducive to ice formation having number average molecular weights of 200 to 14,000, such as 400-12,000, or 900-2000. Suitable polysiloxanes include polymeric polysiloxanes such as polydimethylsiloxane. In particular embodiments, the polysiloxane has at least one functional group that is reactive with functional groups on at least one other component in the second curable film-forming composition. For example, the polysiloxane may have at least one hydroxyl and/or amine functional group, allowing it to react with the curing agent having isocyanate functional groups. Polydimethylsiloxane having at least two amine functional groups is often used. Examples of commercially available polysiloxanes include WACKER FLUID NH 15D, 40D, and 130D, from Wacker Chemie AG. Typical amounts of polysiloxane in the curable film-forming composition range from 3 to 35 percent by weight, often 10 to 30 percent by weight, based on the total weight of resin solids in the curable film-forming composition.

In certain embodiments of the present invention, the second curable film-forming composition comprises (ii) a polysiloxane polymer and a silane curing agent having at least two alkoxy and/or acyloxy functional groups. The polysiloxane polymer typically has active hydrogen groups such as hydroxyl groups. The silane curing agent can be any of those disclosed above for use in the first curable film-forming composition.

Any of the film-forming compositions used in the method of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate. It is believed that the fillers, in combination with the resins in the compositions, allow for useful rheological properties such as high viscosity at low shear. The combination of fillers and resins in the coating compositions, particularly in the first curable film-forming composition, also allows for filling and/or bridging of surface defects on a substrate, making the substrate surface smoother than would be possible with other coating compositions. The ability of the first coating layer to smooth surface defects on the substrate substantially decreases or even eliminates the need for substrate surface preparation such as by sanding or the use of body putty, which can be time-consuming, labor-intensive, and expensive manufacturing steps. This advantage is particularly useful in the coating of large substrate parts or substrates with significant surface roughness, such as fiberglass substrates used in the manufacturing of wind blades. In certain embodiments of the present invention, at least 80 percent of surface defects of a substrate are corrected to an acceptable degree (i.e., requiring no additional surface preparation) upon application of the first coating layer.

The film-forming compositions can additionally include a variety of optional ingredients and/or additives that are somewhat dependent on the particular application of the curable composition, such as curing catalysts, pigments or other colorants as discussed below, reinforcements, thixotropes, accelerators, surfactants, plasticizers, extenders, stabilizers, corrosion inhibitors, diluents, hindered amine light stabilizers, UV light absorbers, and antioxidants.

The curable compositions used in the present invention can be prepared as a two-package composition, typically curable at ambient temperature. Two-package curable compositions are typically prepared by combining the ingredients immediately before use.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 2-25 mils (50.8-635 microns), often 5-25 mils (127.635 microns).

After forming a film of the coating on the substrate, the first composition can be cured by allowing it to stand at ambient temperature, or a combination of ambient temperature cure and baking, or by baking alone. The composition can be cured at ambient temperature typically in a period ranging from about 24 hour to about 36 hours. If ambient temperature and baking are utilized in combination, the composition is typically allowed to stand for a period of from about 5 hours to about 24 hours followed by baking at a temperature up to about 140° F. (60° C.), for a period of time ranging from about 20 minutes to about 1 hour. The second curable film-forming composition may be applied to the first before curing the first and the two cured together; alternatively, the second curable film-forming composition may be applied after curing of the first.

After application of the curable film-forming compositions to the substrate and upon curing, the first curable film-forming composition demonstrates a lower Young's modulus than the second curable film-forming composition. Moreover, after application of the curable film-forming compositions to the substrate and upon curing, the coated substrate demonstrates a maximum average load force of 400 N, often 300 N, more often 200 N or 100 N, when subjected to ICE ADHESION TEST described below.

The following examples are intended to illustrate various embodiments of the invention, and should not be construed as limiting the invention in any way.

EXAMPLES

To evaluate the effectiveness of formulation changes on ice adhesion an ICE ADHESION TEST was developed. The test method used was described in US Army Corps of Engineers Engineer Research and Development Center document number ERDC/CRREL TR-06-11 which is incorporated herein by reference. The fixture design as described therein was modified to interface with existing testing equipment and to receive test panels of approximately 0.032" thick. Generally, the procedure was as follows: A 4" wide test panel was coated on both sides with the desired coating(s). After the appropriate cure time, five 1×4" strips were cut from the test panel. The test strips were taped in place in the center of the test fixture such that the fixture could be filled with water one inch deep. Chilled water was used to fill the test fixtures ensuring that both sides of the coated panel are in contact with one inch of water. The entire test fixture was placed in a −20° C. freezer overnight. Then the test fixture was transferred to a tensile tester (e.g. INSTRON 5567) equipped with an environmental chamber also set to −20° C. The test fixture was mounted such that the fixed end of the tensile tester is connected to the test fixture and the movable jaw is connected to the test panel. This testing setup creates a relative motion between the test strip and the ice that was formed from the water. The tape that held the test strip and water in place was removed and then, using a constant extension rate, the maximum force required to remove the panel from the ice was recorded Typically, five specimens of each coating variation were tested and an average maximum load reported.

Example 1

Example 1 demonstrates the preparation of curable film-forming compositions according to the present invention. AUE-57035 (commercially available from PPG Industries, Inc.), and AUE-3550 (isocyanate hardener, commercially available from PPG Industries, Inc.) were added together and the mixture was stirred. n-butyl acetate was added as an additional solvent to thin the coating to a viscosity appropriate for a HVLP spray gun. Topcoats were applied using an HVLP spray gun at 30 psi. The coating was applied in two coats with a five to ten minute ambient flash between coats. Prior to topcoating, the panels were coated with a primer, SIGMASHIELD 620 (commercially available from PPG Industries, Inc.). The SIGMASHIELD 620 was mixed at a 3:1 ratio by volume with SIGMASHIELD 620 Hardener and stirred. Xylene was then added at 5% by weight to the mix and stirred in. The mixed primer was applied using a BINKS Model 95 pressure pot spray gun to a dry mil thickness of 2 mils. The primer was allowed to cure at ambient conditions for 24 hours. After primer application, SIGMAGLIDE 790 (commercially available from PPG Industries, Inc.) was mixed at a 19:1 ratio by volume with SIGMAGLIDE 790 Hardener and stirred to form a tie-coat. The mixed tie-coat was then applied using a BINKS Model 95 pressure pot spray gun to a dry mil thickness of 4 mils. The coating was allowed to cure at ambient conditions for 24 hours. Table 1 shows the topcoat formulations tested.

TABLE 1

| Description | Formulation 1 (g) |
|---|---|
| AUE-57035 | 312.6 |
| AUE-3550 | 64.8 |
| n-butyl acetate | 22.6 |
| Total | 400 |

The coatings were applied to a cold-roiled steel panel test panel coated with ED6060CZ obtained from ACT Test Panels LLC after scuffing the surface with a 3M SCOTCH-BRITE. After topcoat application, the coating was allowed to dry and cure for seven days under ambient conditions prior to testing. Ice adhesion testing was then carried out per the above described procedure. Table 2 outlines the ice adhesion testing results.

TABLE 2

Ice adhesion test results.

| Coating layers | Avg. Max Load (N)[1] |
|---|---|
| SIGMASHIELD 620/SIGMAGLIDE 790/Formulation 1 | 92.4 |

[1]Average of 5 test specimens

The use of a relatively flexible coating layer beneath the topcoat leads to low ice adhesion with various topcoat formulations.

Example 2

Example 2 demonstrates the preparation of substrate with a polysiloxane coating useful for mitigating ice build-up.

SIGMASHIELD 620 (commercially available from PPG Industries, Inc.) was applied to a cold-rolled steel panel test panel coated with ED6060CZ obtained from ACT Test Panels LLC after scuffing the surface with a 3M SCOTCH-BRITE. The coating was applied using a BINKS 2001 spray gun at 45 psi and a pot pressure of 35 psi. The coating was applied in two coats with a five to ten minute ambient flash between coats. The coating was allowed to dry and cure for one to two days under ambient conditions prior to topcoating. SIGMAGLIDE 790a polysiloxane coating, was then applied as a topcoat with a BINKS 95 spray gun at 60 psi and a pot pressure of 2 psi. After at least seven days of ambient temperature curing, ice adhesion testing was then carried out per the above described procedure. Table 3 outlines the ice adhesion testing results.

TABLE 3

Ice adhesion test results.

| Coating layers | Avg. Max Load (N)[1] |
|---|---|
| SIGMASHIELD 620/SIGMAGLIDE 790 | 43 |
| HSP-7401/AUE-57035 (comparative) | 602 |

[1]Average of 5 test specimens

The data in Table 3 clearly indicates the very low adhesion of ice to the polysiloxane based coating as compared to a polyurethane coating. This low ice adhesion would facilitate the easy removal of ice even at very low forces, thereby mitigating significant ice accretion.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:
1. A method of mitigating ice build-up on a substrate, comprising applying to the substrate a first curable film-forming composition, wherein the first curable film-forming composition comprises:
   (a) a polymeric polyol and a polyisocyanate curing agent; or
   (b) a polysiloxane polymer and a silane curing agent comprising at least two alkoxy and/or acyloxy functional groups; and
   applying to the first curable film-forming composition a second curable film-forming composition, wherein the second curable film-forming composition comprises:
   (i) (a) a curing agent comprising isocyanate functional groups;
   (b) at least one film-forming polymer comprising functional groups reactive with the isocyanate groups in (a); and
   (c) a polysiloxane present in the second curable film-forming composition in an amount sufficient to mitigate ice build-up on the substrate when subjected to conditions conducive to ice formation; or
   (ii) a polysiloxane polymer and a silane curing agent comprising at least two alkoxy and/or acyloxy functional groups; wherein upon application of the curable film-forming compositions to the substrate and upon curing, the first curable film-forming composition demonstrates a lower Young's modulus than the second curable film-forming composition, and the coated substrate demonstrates a maximum average load force of 400 N when subjected to ICE ADHESION TEST.
2. The method of claim wherein a primer film-forming composition is applied to the substrate prior to the application of the first curable film-forming composition.
3. The method of claim 1 wherein the first curable film-forming composition comprises a polymeric polyol and a polyisocyanate curing agent and the second curable film-forming composition comprises:
   (a) a curing agent comprising isocyanate functional groups;
   (b) at least one film-forming polymer having functional groups reactive with the isocyanate groups in (a); and
   (c) a polysiloxane present in the second curable film-forming composition in an amount sufficient to mitigate ice build-up on the substrate when subjected to conditions conducive to ice formation.

4. The method of claim 3 wherein the polymeric polyol comprises a polyester polyol and/or a polyether polyol.

5. The method of claim 4 wherein the polymeric polyol comprises polytetrahydrofuran.

6. The method of claim 1 wherein the first curable film-forming composition comprises a polysiloxane polymer comprising hydroxyl functional groups and a silane curing agent comprising at least two alkoxy and/or acyloxy functional groups; and the second curable film-forming composition comprises:
   (a) a curing agent comprising isocyanate functional groups;
   (b) at least one film-forming polymer comprising functional groups reactive with the isocyanate groups in (a); and
   (c) a polysiloxane present in the second curable film-forming composition in an amount sufficient to mitigate ice build-up on the substrate when subjected to conditions conducive to ice formation.

7. The method of claim 1 wherein the first curable film-forming composition comprises a polysiloxane polymer comprising hydroxyl functional groups and a silane curing agent comprising at least two alkoxy and/or acyloxy functional groups; and the second curable film-forming composition is different from the first curable film-forming composition and comprises a polysiloxane polymer and a silane curing agent comprising at least two alkoxy and/or acyloxy functional groups.

8. The method of claim 1, wherein the second curable film-forming composition comprises:
   (a) a curing agent comprising isocyanate functional groups;
   (b) at least one film-forming polymer comprising functional groups reactive with the isocyanate groups in (a); and
   (c) a polysiloxane present in the second curable film-forming composition in an amount sufficient to mitigate ice build-up on the substrate when subjected to conditions conducive to ice formation; and wherein the curing agent (a) in the second curable film-forming composition comprises a trimer of hexamethylene diisocyanate.

9. The method of claim 8, wherein the polymer of (b) in the second curable film-forming composition comprises an acrylic polymer and/or a polyester polymer.

10. The method of claim 8 wherein the polymer of (b) in the second curable film-forming composition comprises hydroxyl and/or amine functional groups.

11. The method of claim 8 wherein the polysiloxane of (c) comprises at least one functional group that is reactive with functional groups on at least one other component in the second curable film-forming composition.

12. The method of claim 11 wherein the polysiloxane comprises at least one hydroxyl and/or amine functional group.

13. The method of claim 12 wherein the polysiloxane comprises polydimethylsiloxane and comprises at least two amine functional groups.

14. The method of claim 8 wherein the polysiloxane of (c) has a number average molecular weight of 200 to 14,000.

15. The method of claim 8 wherein the polysiloxane of (c) is present in the second curable film-forming composition in an amount of 3 to 35 percent by weight, based on the total weight of resin solids in the second curable film-forming composition.

16. The method of claim 15 wherein the polysiloxane of (c) is present in the second curable film-forming composition in an amount of 10 to 30 percent by weight, based on the total weight of resin solids in the second curable film-forming composition.

17. The method of claim 1, wherein the curable film-forming compositions are cured at ambient temperature.

18. The method of claim 1, wherein the substrate comprises metal, plastic, or a fiberglass and/or carbon fiber composite.

19. The method of claim 18, wherein the substrate comprises a wind blade.

20. A method of mitigating ice build-up on a substrate, comprising applying to the substrate a curable film-forming composition, wherein the curable film-forming composition comprises a polysiloxane polymer and a silane curing agent comprising at least two alkoxy and/or acyloxy functional groups;
   wherein upon application of the curable film-forming composition to the substrate and upon curing, the coated substrate demonstrates a maximum average load force of 400 N when subjected to ICE ADHESION TEST.

21. The method of claim 20 wherein a primer film-forming composition is applied to the substrate prior to the application of the curable film-forming composition.

22. The method of claim 20, further comprising applying to the curable film-forming composition a second curable film-forming composition, wherein the second curing film-forming composition comprises:
   (a) a curing agent comprising isocyanate functional groups; and
   (b) At least one film-forming polymer comprising functionally groups reactive with the isocyanate groups in (a).

* * * * *